Sept. 21, 1954

D. LEYPOLD 2,689,881

CIRCUIT MEANS FOR ADJUSTING FREQUENCY KEYED TELEGRAPH RECEIVERS

Filed Oct. 19, 1951

Inventor:
Dieter Leypold

By [signature] Atty.

Patented Sept. 21, 1954 2,689,881

UNITED STATES PATENT OFFICE 2,689,881

CIRCUIT MEANS FOR ADJUSTING FREQUENCY KEYED TELEGRAPH RECEIVERS

Dieter Leypold, Munich, Germany, assignor to Siemens & Halske Aktiengesellschaft, Munich and Berlin, Germany, a German corporation Application October 19, 1951, Serial No. 252,018

Claims priority, application Germany November 2, 1950

4 Claims. (Cl. 178—69)

This invention relates to circuit means for automatically adjusting the frequency in telegraph receivers coacting with frequency shift keyed transmitters which transmit signals as alternate marking and spacing conditions at different radio frequencies, and is particularly concerned with means for producing from an adjusting current a voltage which indicates variations in the magnitude of the frequency adjustment.

The copending application Ser. No. 188,628, filed October 4, 1950, now Patent No. 2,641,650, dated June 9, 1953, describes circuit means for adjusting the receiver frequency by utilizing the frequencies corresponding to the marking as well as to the spacing currents. This is accomplished by transforming these frequencies in an auxiliary modulator into the identical frequency range and conducting the resulting frequency to a common control frequency filter. The resulting voltage is conducted to a generator or oscillator which furnishes the carrier frequency for the oscillator of the last or one of the last modulator stages. The phase positions of the input and output of the oscillator are compared in a suitable known device, e. g., in a phase bridge or phase discriminator which furnishes a voltage depending on the phase difference, i. e., an adjusting or control voltage for the carrier frequency oscillator of a modulation stage which lies ahead of the control frequency filter. The carrier voltages for the auxiliary modulator may be obtained, e. g., from a two-frequency generator.

Figure 4:
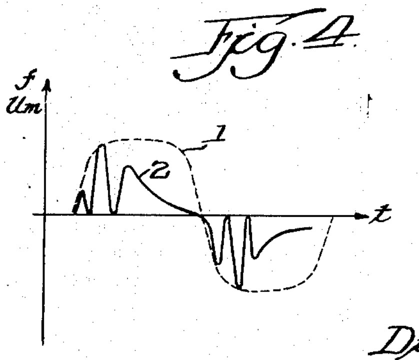

The various features of the invention will be brought out in the course of the following description which is rendered with reference to the accompanying drawings. In these drawings, Fig. 1 shows the invention as applied to a system having component parts diagrammatically illustrated in block form; and Figs. 2–4 represent curves of the control currents produced by the invention as they are indicated upon the viewing screen of an oscillograph.

Figures 1, 2, 3:
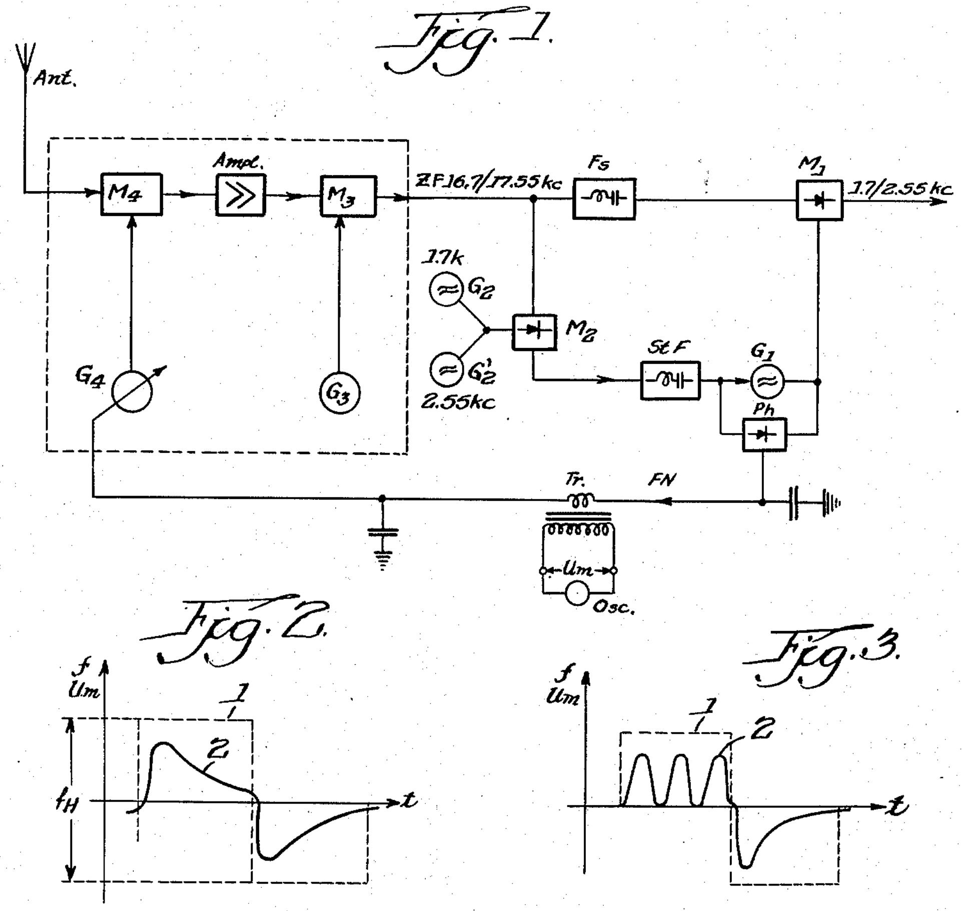

Fig. 1 shows as an example the component parts of a system for utilizing for the control of the receiver frequency the frequencies corresponding to the marking as well as to the spacing currents. The circuit shows only the elements required for conveying an understanding of the frequency adjustment. The signals are received over an antenna *Ant.* and are conducted to a first detector $M_4$ and then over amplifier means to a second detector $M_3$. There are two local generators $G_4$ and $G_3$ respectively associated with the detectors $M_4$ and $M_3$.

These elements are enclosed by a dotted rectangle as they are old and shown, e. g., in Patents Nos. 2,211,750 (Figs. 2 and 3); 2,232,390 (Figs. 1 and 2); and 2,341,649 (Fig. 1). The intermediate frequencies are directed over the line ZF to the filter F*s* to the known modulator $M_1$, these frequencies ranging, e. g., from 16.7 to 17.55 kc. These frequencies are modulated in the modulator $M_1$ by 15 kc. (generator $G_1$), and at the output appear frequencies varying from 1.7 to 2.55 kc. The intermediate frequency ZF is for the frequency adjustment also modulated in the auxiliary modulator $M_2$, with 1.7 kc. (generator $G_2$) and with 2.55 kc. (generator $G'_2$). The generators $G_2$ and $G'_2$ may be elements of a common unitary generator device of known construction. At the output of the modulator $M_2$, which is of known construction appears from the frequency 16.7 as well as from the frequency 17.55 the control frequency 15 kc., which means that the marking and the spacing currents have been transformed into the identical frequency position of 15 *kc.* The control frequency of 15 kc. is conducted over the narrow control frequency filter S*t*F of known construction to produce the control voltage for the oscillator or generator $G_1$ of the modulation stage $M_1$. The phase positions of the control voltage and the output voltage of the oscillator are in known manner compared in the phase bridge or phase discriminator P*h*, and the voltage furnished by the phase bridge P*h* which is proportional to the phase difference of the input and output voltages of the oscillator $G_1$ is transmitted over the line FN to the local oscillator $G_4$ (or if desired to the local oscillator $G_3$) for adjusting the frequency thereof for the purpose of modulation in the associated detector or modulator stage $M_4$ (or $M_3$). The system thus produces a constantly effective frequency adjustment.

It may happen that the frequency shift in the transmitter does not agree with the frequency spacing of the heterodyned frequencies produced by the generator $G_2$ and $G'_2$ and conducted to the auxiliary modulator $M_2$. The locked-in carrier frequency oscillator $G_1$ must in such case be caused to change its frequency in step with the telegraph signals. However, if the frequency shift in the transmitter differs considerably from the frequency spacing of the two frequencies produced at $G_2$ and $G'_2$, the carrier frequency oscillator $G_1$ will be locked-in only by one of the two incoming telegraph frequencies. A frequency adjustment voltage, which regulates the frequency of the oscillator in the first detector $M_4$, is produced in a device such as Ph responding to phase differences, such device being supplied by the input and output voltages of the locked-in carrier frequency oscillator $G_1$. There occur in this case, responsive to the switching from one to the other frequency, frequency-adjusting current impulses. Due to the short duration of the telegraph signals, these impulses do not cause any appreciable variation of the oscillator frequency which is controlled by the adjusting voltage.

The invention provides a control device which produces a supervising voltage from the frequency-adjusting voltage conducted over the line FN to serve as a criterion for the correct adjustment of the phase bridge or phase discriminator Ph. The supervising voltage is produced by differentiating elements, particularly current and voltage transformers or combinations of resistors which are included in the line such as FN carrying the frequency-adjusting voltage to the first detector. The supervising voltage may be visually signalled by known means, e. g., by a Braunian tube or by a combination of rectifiers and voltage-measuring instruments.

The circuit arrangement and means according to the invention gives for frequency-keyed telegraph receivers the possibility to ascertain the frequency shift of the transmitter, and to adjust the frequencies of the oscillators $G_2$ and $G'_2$ as well as the frequency of the local oscillator so as to bring about synchronous operation with the transmitter by causing the frequencies corresponding to the marking and the spacing currents to fall within the identical range, e. g., within the frequency range of the locked-in generator.

Referring now again to Fig. 1, the frequency-adjusting voltage is produced in the phase discriminator Ph by a comparison of the control frequency derived from the received frequency and conducted to the generator $G_1$ with a frequency produced by the generator $G_1$ as explained before. Adjusting voltages are therefore produced if the receiver is not accurately in step with the received transmitter frequency. These adjusting voltages always exhibit fluctuations in the presence of variations of the transmitter frequency. The frequency-adjusting voltage is conducted over line FN in which is included the primary winding of the transformer Tr. The primary winding of the transformer thus constitutes a differentiating element. Due to the differentiating function of the primary winding of the transformer, a voltage will appear at the terminals of the secondary winding only at such times when there is a variation of the frequency-adjusting voltage in the primary winding, i. e., at times when the received frequency deviates from the adjusted frequency of the receiver. This is the case, e. g., if the frequency shift in the transmitter is out of step with the frequency spacing of the two frequencies $G_2$ and $G'_2$ of the auxiliary modulator $M_2$. The magnitude of the frequency-adjusting voltage produced in the phase bridge increases to a certain degree with increasing difference of the transmitter frequency from the adjusted frequency of the receiver, which means that the amplitude of the supervising voltage $U_m$ at the secondary of the transformer Tr is a criterion for the frequency deviation. This supervising voltage $U_m$ is conducted to an indicating instrument, e. g., an oscillograph Osc., thus making possible the tuning of the receiver based upon the resulting oscillogram. The transmitter frequency, and particularly the shift thereof, can thus be supervised at the receiver.

The form of the supervising voltages appearing on the oscillograph viewing screen is illustrated in Figs. 2–4.

It shall be assumed first that the frequencies corresponding to the marking and to the spacing currents produce an adjusting current impulse in the line FN, due to inaccurate adjustment of the receiver. The curve appearing on the oscillograph screen has in this case approximately the form indicated in Fig. 2 by numeral 2. Over the time coordinate $t$ of the figure is indicated a telegraphic signal by the dotted line 1. The frequencies $f$ for the marking and the spacing currents are differentiated by the frequency shift $f_H$. Always upon alteration from one frequency to the other there appears in the illustrated example a voltage peak of the supervising voltage (curve 2). The smaller the frequency-adjusting currents become, the smaller will be the peak of the supervising voltage. The adjustment of the frequencies $G_2$ and $G'_2$ of the auxiliary modulator $M_2$ is in accordance with the smallest value of these peaks in the form of the curve of the supervising voltage.

If the frequency shift of a transmitter from which signals are received is unknown and if the frequency shift differs from the frequency spacing of the modulating frequencies $G_2$ and $G'_2$, the modulating oscillator will be controlled only by one of the two incoming telegraph frequencies. The oscillogram will then show a curve approximately of the form indicated in Fig. 3. The curve 1 in this figure corresponds to the telegraph signals, and the curve 2 to the supervising voltage $U_m$. The alternating voltage of the curve 2 is produced due to the fact that the modulating oscillator oscillates with a frequency different from the controlling frequency. It is in such a case therefore easily possible to employ the oscillogram for adjusting the frequencies $G_2$ and $G'_2$ for the auxiliary modulator $M_2$.

An important advantage of the invention is that inaccurately frequency-shift keyed transmitters can be recognized by the curve of the supervising voltage $U_m$ appearing on the viewing screen of the oscillograph Osc. A pronounced minimum of the voltage peaks cannot be obtained in such a case, and an uncertain function of the receiver, due to improper operation of the transmitter, can thus be clearly recognized. The oscillogram in such a case is apparent from Fig. 4.

Other indicating instruments may be employed in place of the oscillograph, e. g., measuring instruments in combination with rectifiers for indicating the positive and the negative supervising voltages, respectively.

What is claimed is:

1. In a telegraph receiver coacting with frequency-shift keyed transmitters which alternately transmit marking signals at one frequency and spacing signals at another frequency and having a detector for receiving said signals and oscillator means for modulating the frequencies of said signals in said detector and having phase discriminator means responsive to the frequencies of said marking and said spacing signals for producing a frequency-adjusting current and having a line for conducting such current to said oscillator means to adjust the frequency thereof, a control device comprising a transformer having a primary winding constituting a differentiating element disposed in said line and a secondary winding co-operating with said primary winding, said primary winding being responsive to variations of said frequency-adjusting current flowing therein to produce in said secondary winding a supervising current which oscillates in accordance with such variations, an instrument controlled by said supervising current from said secondary winding for signalling the oscillations thereof to furnish an indication of the characteristics of said frequency-adjusting current as a criterion for the frequency adjustment of said receiver.

2. The structure and co-operation of parts as defined in claim 1 wherein said instrument is a visual indicating instrument.

3. The structure and co-operation of parts as defined in claim 1, wherein an oscillograph constitutes said instrument.

4. In a telegraph receiver coacting with frequency-shift keyed transmitters which alternately transmit marking signals at one frequency and spacing signals at another frequency and having a detector for receiving said signals and a first oscillator coacting with said detector for modulating the frequencies of said signals received thereby and having an auxiliary modulator for receiving said modulated signals and second oscillator means coacting with said auxiliary modulator and having a phase discriminator for receiving the signals modulated in said auxiliary modulator and for producing a frequency-adjusting current and having a line for conducting such current to said first oscillator to adjust the frequency thereof; a control device comprising current differentiating means connected to said line which is responsive to variations of said frequency-adjusting current flowing therein, current producing means operatively connected with said current differentiating means for producing responsive to said current variations in said differentiating means a supervising current which oscillates in accordance with said current variations, and an indicating instrument connected with said current producing means for signalling the oscillations of said supervising current to furnish an indication of the characteristics of said frequency-adjusting current.

References Cited in the file of this patent

UNITED STATES PATENTS

| Number | Name | Date |
|---|---|---|
| 2,154,379 | Estes | Apr. 11, 1939 |
| 2,176,742 | La Pierre | Oct. 17, 1939 |
| 2,233,751 | Seeley | Mar. 4, 1941 |
| 2,613,271 | Trevor | Oct. 7, 1952 |